United States Patent [19]

Holmberg et al.

[11] 3,734,537
[45] May 22, 1973

[54] MECHANISMS FOR COUPLING SEMI-TRAILERS TO TRACTORS

[75] Inventors: Roland Bengt Holmberg, Kalmar; Ralf Krister Ebbe Petersson, Alsterbro, both of Sweden

[73] Assignee: Kalmar Verkstadsaktienbolag, Kalmar, Sweden

[22] Filed: Aug. 12, 1970

[21] Appl. No.: 63,174

[30] Foreign Application Priority Data

Aug. 13, 1969 Sweden..............................11244/69

[52] U.S. Cl.................280/421, 280/422, 280/438 R
[51] Int. Cl..............................................B62d 53/08
[58] Field of Search.....................280/432, 433, 421, 280/422, 438 R

[56] References Cited

UNITED STATES PATENTS

| | | | |
|---|---|---|---|
| 2,924,464 | 2/1960 | Zajac | 280/421 |
| 2,468,705 | 4/1949 | Price | 280/432 |
| 2,709,088 | 5/1955 | Orbits | 280/432 |
| 2,959,429 | 11/1960 | Lavelle | 280/432 |
| 3,380,758 | 4/1968 | Granning | 280/438 R |

Primary Examiner—Leo Friaglia
Assistant Examiner—Robert R. Song
Attorney—Beveridge and De Grandi

[57] ABSTRACT

A mechanism for coupling a semi-trailer to a tractor comprises a fifth wheel mechanism mounted on the tractor and king pin means mounted on the semi-trailer, which mechanism and which means are arranged, after having been brought into coupling position, to be locked in said position by means of a locking device which is operated by fluid pressure. Tracing of the coupling position between the fifth wheel mechanism and the king pin means is facilitated by means of a device which serves to raise and lower the fifth wheel mechanism and which is of the type that can be used to advantage as a spring for the spring suspension of the front end of the semi-trailer during driving.

5 Claims, 15 Drawing Figures

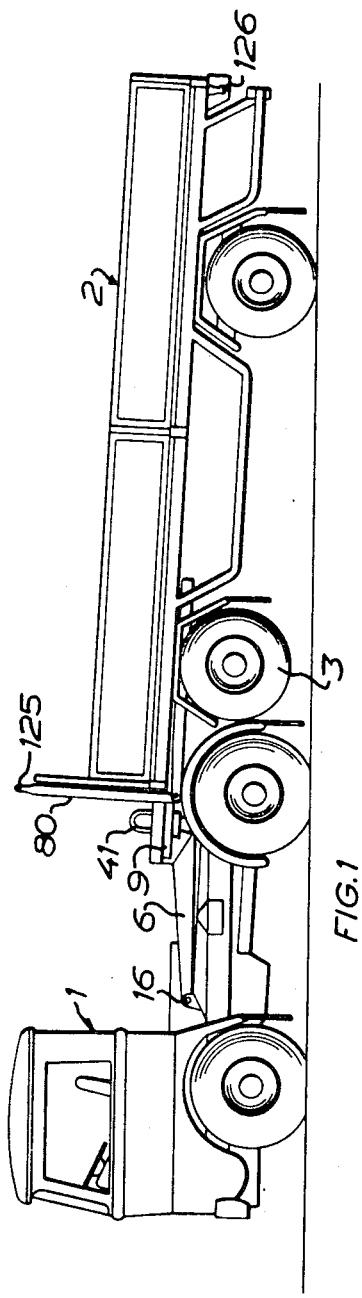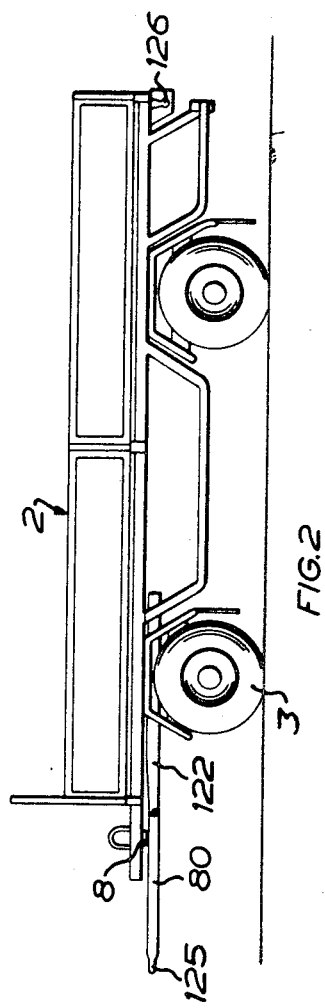

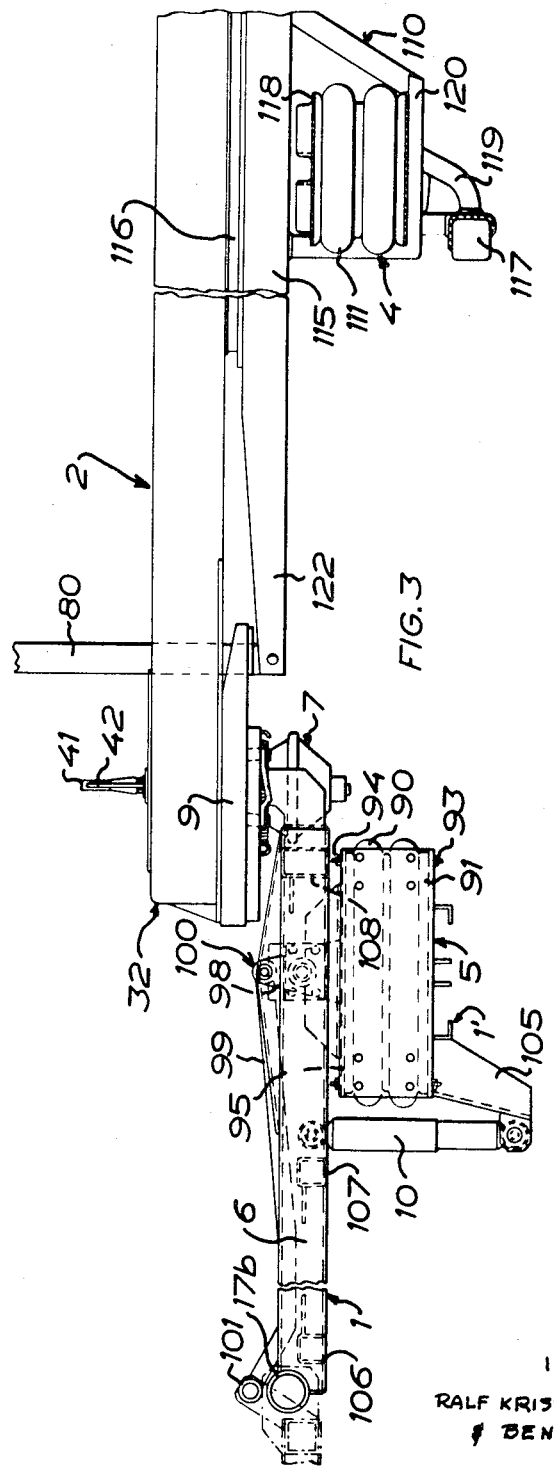

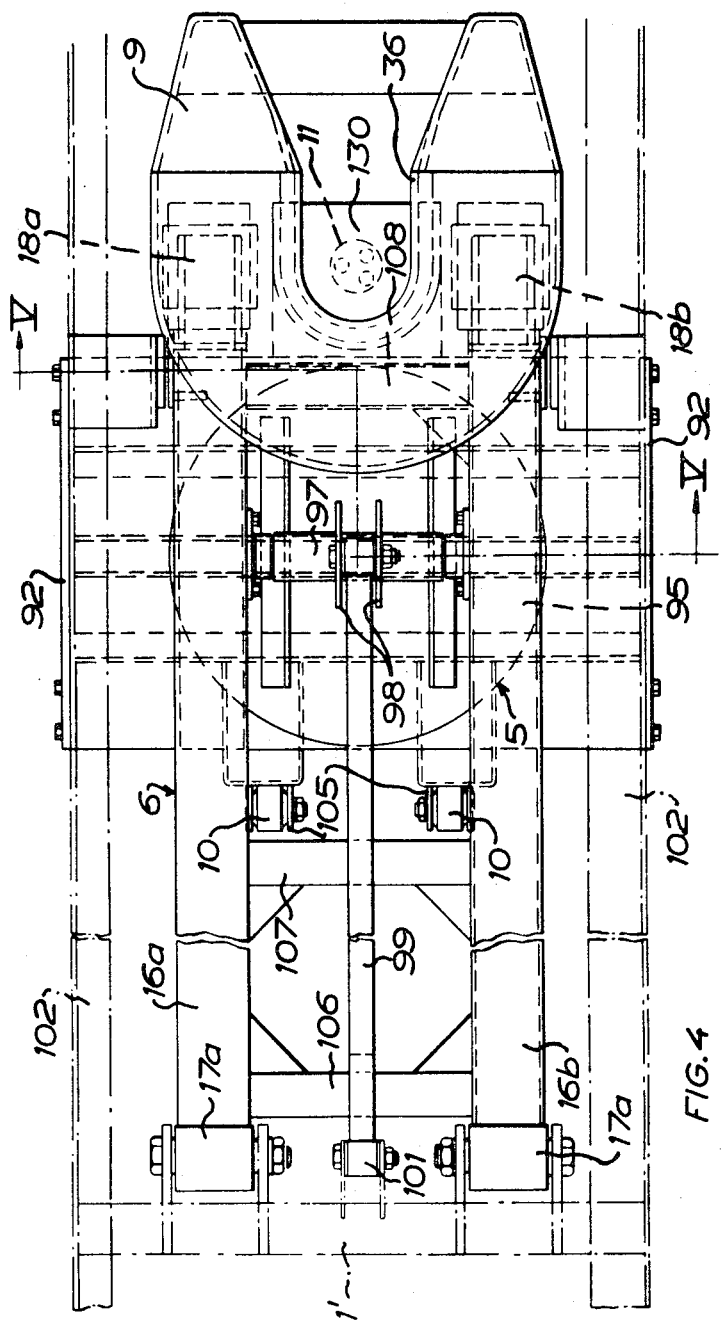

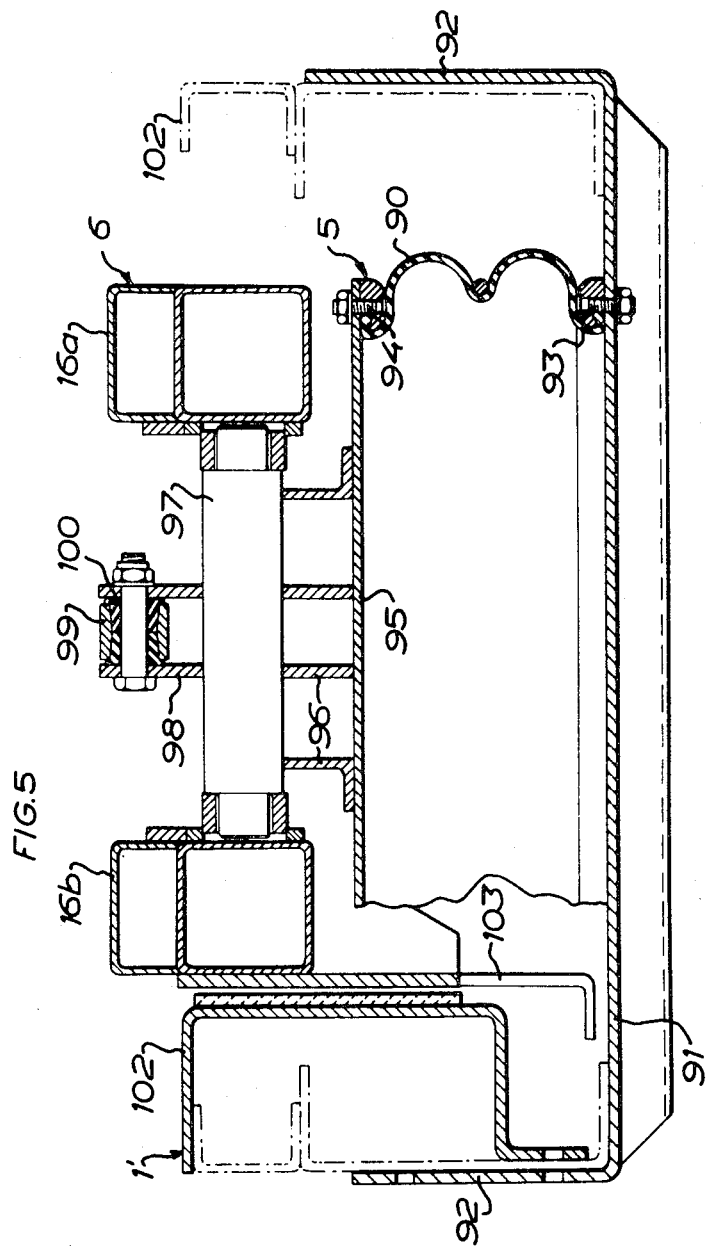

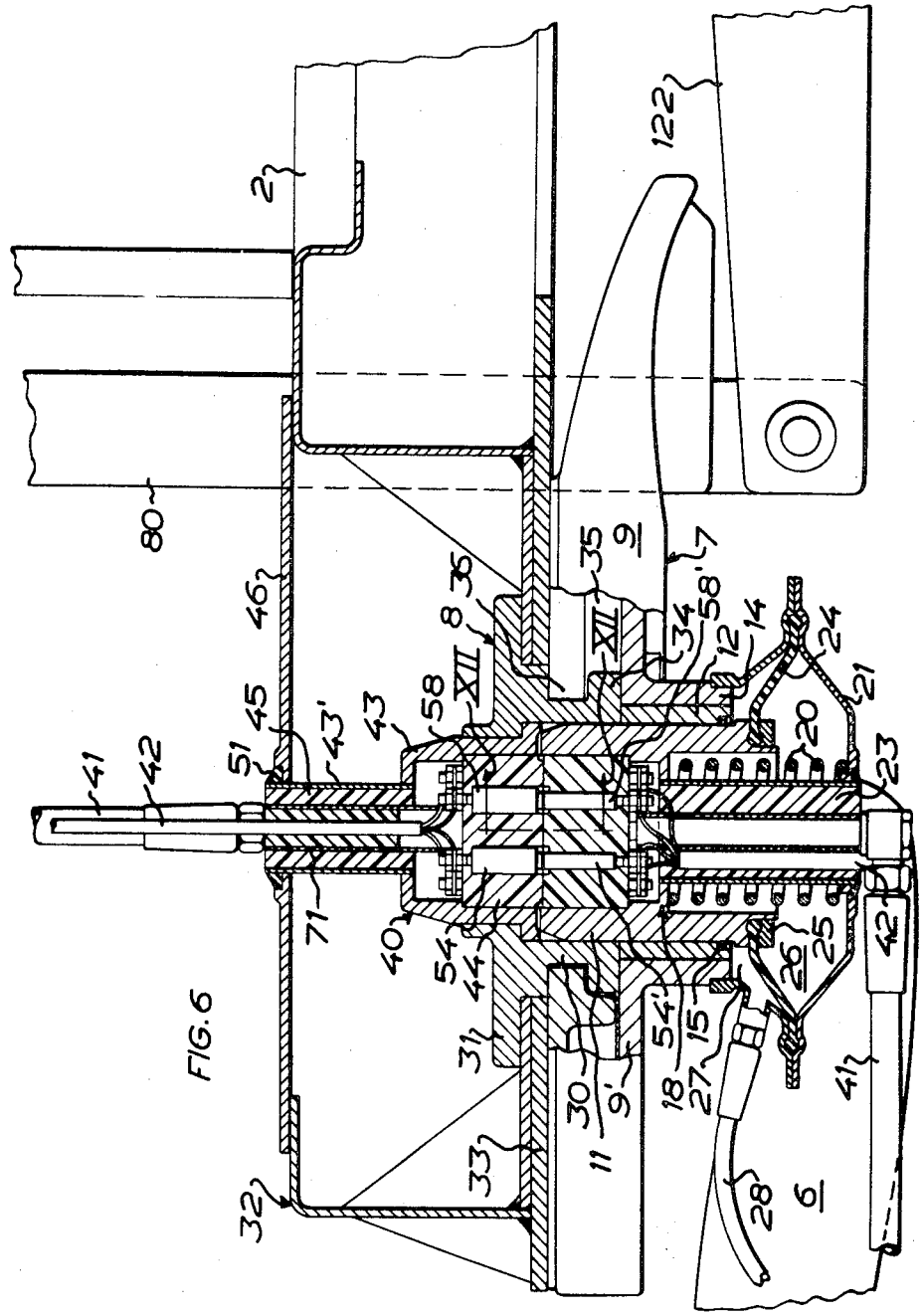

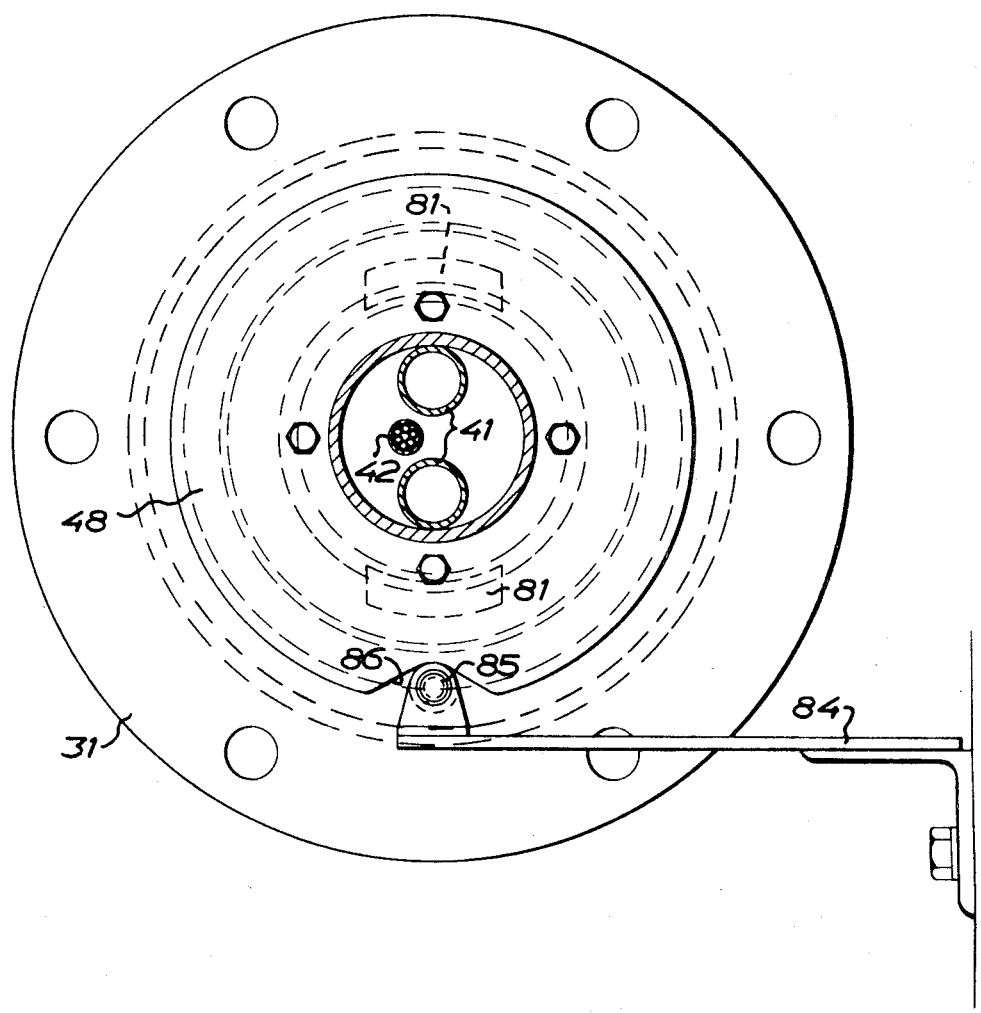

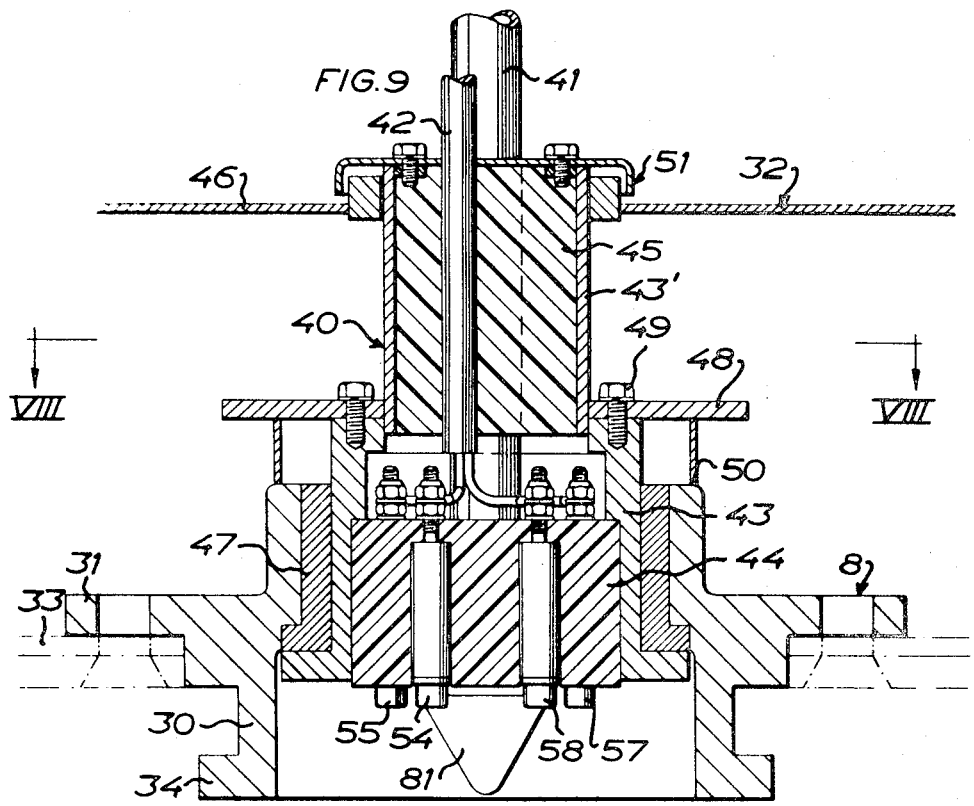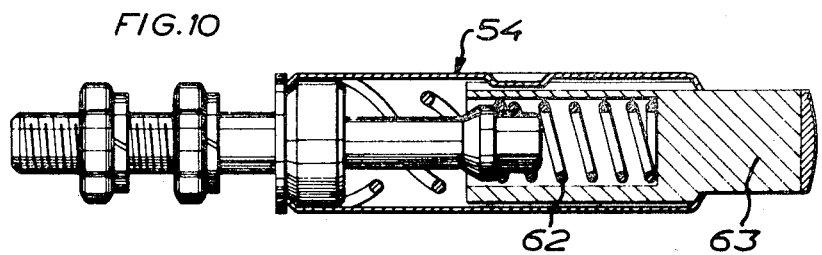

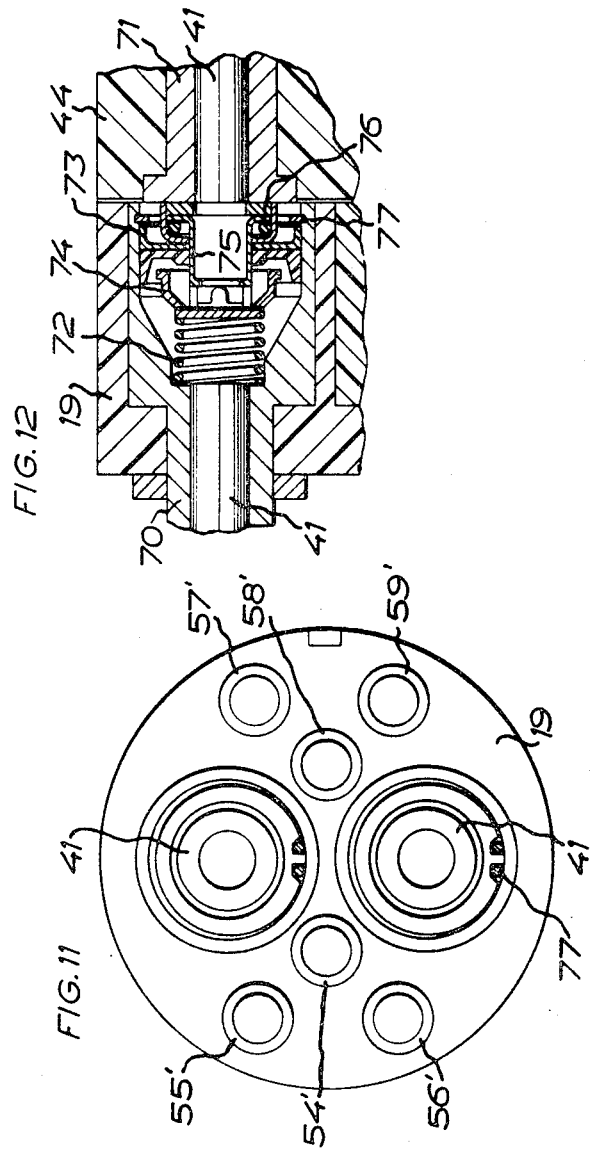

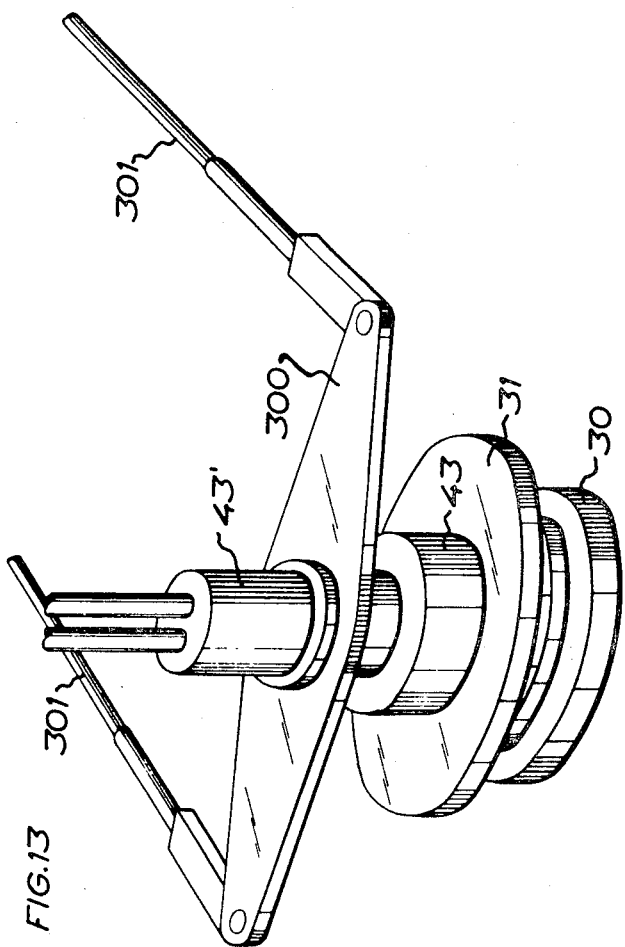

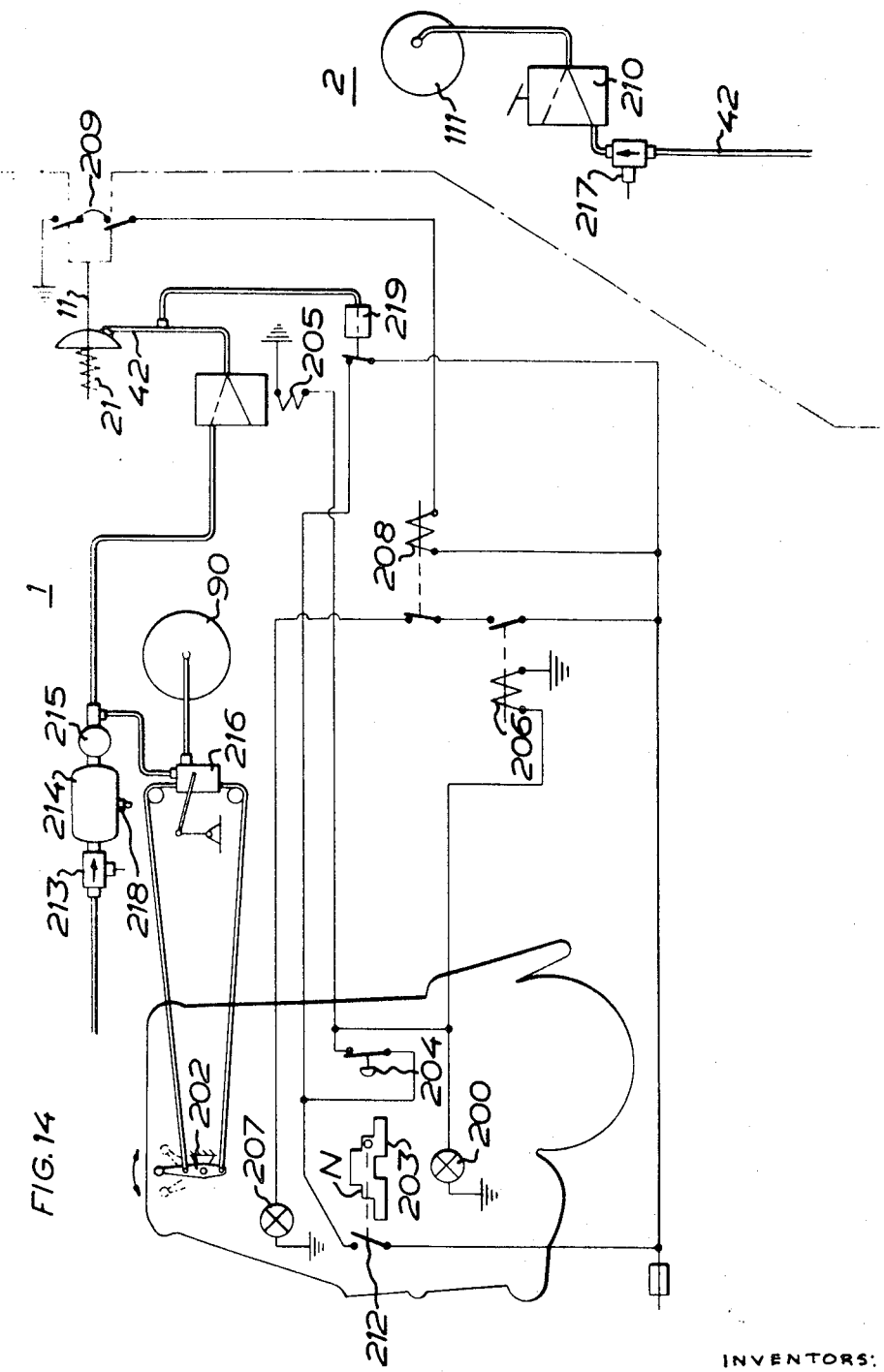

MECHANISMS FOR COUPLING SEMI-TRAILERS TO TRACTORS

This invention relates to a mechanism for coupling a semi-trailer to a tractor comprising a semi-trailer coupling mechanism having a fifth wheel or like support secured to the tractor for the semi-trailer and an opening open from the top and the rear in said support for receiving a king pin secured to the semi-trailer.

The primary object of the invention is to provide a simple but efficient semi-trailer coupling mechanism which permits the automatic coupling of a semi-trailer to a tractor and an efficient latching of the coupling engagement.

Another object of the present invention is to provide a semi-trailer coupling mechanism of this type in which the coupling member secured to the tractor includes a locking bolt and said locking bolt and the king pin of the coupling member secured to the semi-trailer are conformed for mutual engagement and movably arranged relative to one another to permit, after the king pin has been introduced into said opening in the support disposed on the tractor for the semi-trailer, moving the king pin and the locking bolt into mutual engagement for retaining the king pin in the opening.

A further object of the invention is to provide a semi-trailer coupling mechanism comprising a fifth wheel mechanism mounted on the tractor and king pin means mounted on the semi-trailer, said mechanism and said means being arranged, after having been brought into coupling position, to be locked in said position by means of a locking device which is operated by fluid pressure, and in said semi-trailer coupling mechanism tracing of the coupling position between the fifth wheel mechanism and the king pin means is facilitated by means of a device which serves to raise and lower the fifth wheel mechanism and which is of the type that can be used to advantage as a spring for the spring suspension of the front end of the semi-trailer during driving.

Preferred embodiments of this coupling mechanism have the characteristic features appearing from the appended subclaims.

The coupling mechanism suggested by the present invention offers the possibility, without appreciable complication, to take off mechanical power in dependence on the relative angular articulation of the tractor and the semi-trailer during driving and to exploit this power for various useful purposes.

These and further features of and advantages gained by the invention will appear from the following description, reference being made to the accompanying drawings in which:

FIG. 1 is a side elevation of a tractor with a semi-trailer coupled thereto, that can be used as a full trailer in accordance with the invention;

FIG. 2 is a view of the semi-trailer shown in FIG. 1 in parking position or in position as a full trailer;

FIG. 3 is a fragmentary longitudinal section of the vehicle combination in FIG. 1, with the coupling mechanism in side elevation;

FIG. 4 is a plan view of the fifth wheel shown in FIG. 1 and carried by a movable frame section of the tractor;

FIG. 5 is a cross section of the vehicle frame on line V—V in FIG. 4;

FIG. 6 is a vertical longitudinal section taken on a larger scale of the coupling mechanism shown in FIG. 3;

FIG. 8 is a detailed horizontal section taken on line VIII—VIII in FIG. 9 of a slightly modified embodiment of the coupling member secured to the trailer;

FIG. 9 is a vertical section of the coupling member in FIG. 8;

FIG. 10 is a longitudinal section of an electrical contact element having a movable contact;

FIG. 11 is a plan view of a connector member of the fifth wheel unit for electrical and pneumatical interconnection with a corresponding connector member in the coupling member secured to the trailer when the trailer is used as a semi-trailer;

FIG. 12 is a fragmentary vertical section taken on line XII—XII in FIG. 6;

FIG. 13 is a view of an operating device;

FIG. 14 is a basic diagram illustrating the electrical and pneumatical circuits in the automatic semi-trailer coupling mechanism according to the invention when the tractor is driven without semi-trailer;

Figure 7:
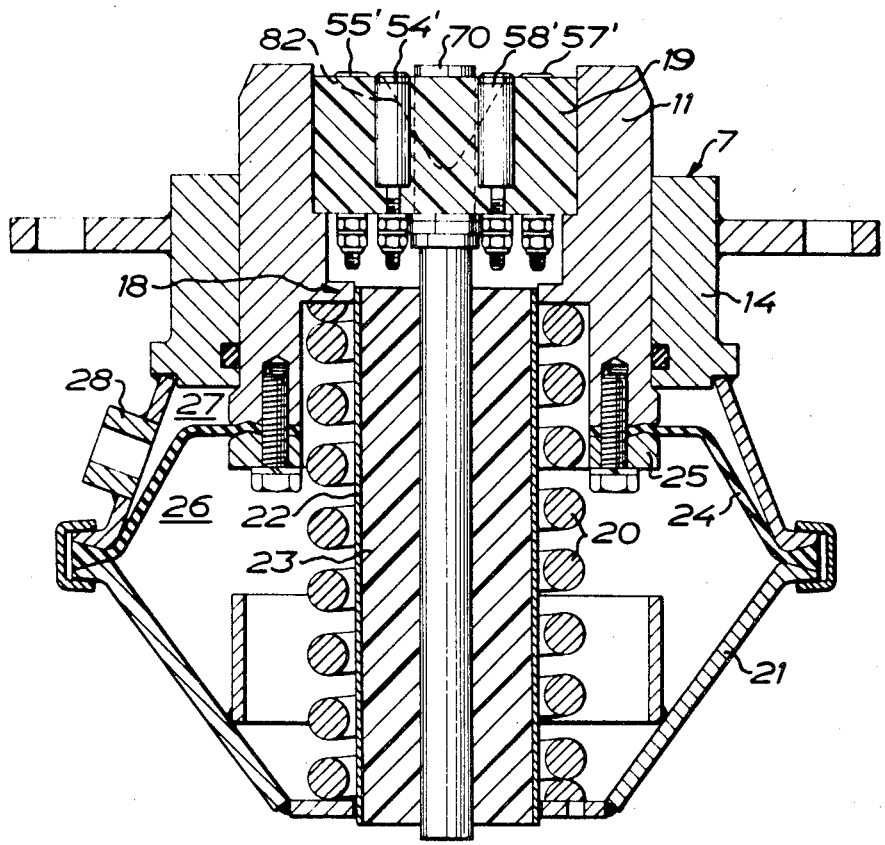
FIG. 7 is a vertical longitudinal section of a unit consisting of a locking bolt according to the invention and the operating mechanism thereof prior to mounting on the tractor in FIG. 1 or after dismounting.

The tractor 1 shown in FIG. 1 is equipped with both a semi-trailer coupling mechanism according to the invention and a conventional trailer coupling mechanism, and the semi-trailer 2 illustrated can be used also as a full trailer. It is therefore equipped with both a semi-trailer coupling mechanism and a trailer coupling mechanism.

The trailer coupling parts mounted on the tractor 1 and those mounted on the trailer/semi-trailer 2 may be of conventional design and are not described here in detail. However, certain elements of these parts are mentioned in the following and are shown in FIGS. 1, 2 and 3.

To permit using the trailer as a semi-trailer the front wheels 3 of the trailer can be raised, in accordance with the invention, by means of a lifting device 4 which is of the pneumatical type in the illustrated embodiment. Moreover, the automatic coupling mechanism according to the invention includes a lifting device 5 for height adjustment of a vertically movable section 6 of the vehicle frame 1'. Said frame section which is pivoted to the main frame of the vehicle carries the semi-trailer coupling member 7 of the tractor, which is to be engaged with a complementary coupling member 8 mounted on the trailer 2. The height adjustment device 5 is a pneumatical type lifting device and is arranged between the vehicle frame 1' and the pivotally mounted vehicle section 6 to enable height adjustment of the fifth wheel 9 of the coupling member 7, which is mounted on the frame section 6. If desired, the height adjustment device 5 can be used as spring means in combination with shock absorbers 10 (FIG. 3).

After this general orientation about the mechanisms and devices according to the invention for using the trailer 2 as a semi-trailer and the various means provided for this purpose, the coupling mechanism 7, 8 proper will now be described more in detail.

The two coupling members 7, 8 are shown engaged in side elevation in FIG. 3 and in vertical section in FIG. 6. The mechanical coupling member secured to the tractor comprises, as already mentioned, a fifth wheel 9 which is in the shape of a horseshoe (see FIG. 4) and a locking bolt 11 displaceably mounted centrally in the hollow space of the fifth wheel. The vertical locking bolt 11 is displaceable in a bearing bushing 12 which is connected to a vertically downwardly directed sleeve-shaped portion 14 of a plate 9' forming the bottom plate of the fifth wheel 9. The locking bolt 11 is sealed in relation to the bearing bushing 12 by means of a packing 15. The fifth wheel 9 is carried on the pivotally mounted vehicle frame section 6 which in the embodiment illustrated in FIGS. 4-6 consists of two parallel frame beams 16a, 16b which at their front ends are connected to the vehicle frame 1' by fulcrums 17a, 17b. At their rear ends the two frame beams 16a, 16b are connected to fastenings at the underside of the fifth wheel 9 by means of rubber bearings 18a, 18b to allow a certain resilience of the fifth wheel relative to the two frame beams 16a, 16b.

The locking bolt 11 which is displaceable in the bearing bushing 12 connected to the fifth wheel 9 is hollow and has an inner supporting flange 18 carrying an insulator body 19 which is inserted in the locking bolt and consists of for instance molded plastics material and contains air pressure and electrical power service lines which are described more in detail in the following. In the lower half of the hollow locking bolt 11 there is inserted a strong spring 20 which bears with its upper end against the supporting flange 18 and with its lower end engages the bottom of a compressed air box 21 connected to the pivotally mounted vehicle frame section 6. The compressed air box 21 which in a bottom hole receives and snugly embraces an insert in the form of a sleeve 22 which contains an insulator body 23 of for instance plastics material with air pressure and electric power service lines leading from the tractor to the air pressure and electrical power connections in the insulator body 19, is sealingly connected at its upper "open" edge to the lower part of the sleeve 12, which is directed downwardly from the fifth wheel 9, and contains a flexible annular diaphragm 24 which is tightly secured between the two halves of the compressed air box 21 with its outer marginal portion and is tightly clamped against the underside of the locking bolt 11 with its inner circumferential margin by means of a clamping ring 25. The annular diaphragm 24 divides the space in the circular compressed air box 21 into a lower chamber 26 and an upper chamber 27. The upper chamber 27 is connected through an air conduit 28 to an air feed conduit in the tractor. By the supply of compressed air to the upper chamber 27 the diaphragm 24 can be urged downwardly towards the bottom of the compressed air box 21, the diaphragm taking the locking bolt 11 along downwardly against the action of the spring 20 which tends to hold the locking bolt 11 in the upper position engaged with the hollow king pin 30 which is part of the semi-trailer coupling member 8 secured to the trailer 2.

In the embodiment shown in FIG. 6 and in the modification shown in FIG. 9 the king pin 30 consists of a sleeve-shaped body having an upper flange 31 which is connected for example by means of bolts to the bottom plate 33 of a box-shaped frame section 32 at the front end of the semi-trailer 2. At the lower end the king pin 30 has a flange 34 which in coupling position (see FIG. 6) engages in a groove 35 beneath a flange 36 along the inner circumference of the horseshoe-shaped fifth wheel 9 (cf. also FIG. 4). Owing to the engagement between the locking bolt 11 and the king pin 30 the latter is retained in its position in the horseshoe-shaped fifth wheel 9 with the annular flange 34 engaged in the groove 35 beneath the flange 36 of the fifth wheel 9. Vertical movement of the king pin 30 is prevented by the mutual engagement between the flanges 34 and 36. The front end 32 of the semi-trailer rests with the bottom plate 33 on the upper side of the fifth wheel 9, allowing for the requisite pivot movement. Wear of the coupling mechanism 7, 8 takes place between the king pin 30 and the fifth wheel 9, while the pull is essentially taken up by the locking bolt 11 which is mainly exposed to shear.

Mounted in the upper part of the annular or sleeve-shaped king pin 30 is an air pressure and electrical power connector member in the form of a box 40 at the ends of two flexible air hoses 41 and one or two flexible electrical cables 42 for supplying air pressure and electrical power from the tractor to the trailer. Said connector member 40 comprises a sleeve 43 and an extension 43' thereof and contains an outer insulator body 44 and an upper insulator body 45 which correspond to the insulator bodies 19 and 23 in the locking bolt 11. The electrical power cables extend through the upper insulator body 45 to the upper end of the insulator body 44, which serves as a terminal block. The unit formed by the elements 40–45 is rotatably mounted in the sleeve-shaped king pin 30 and in the upper wall 46 of the frame section 32 at the front end of the trailer 2. As will appear more clearly from the modification in FIG. 9 the unit 40–45 described can be mounted in the sleeve-shaped king pin 30 by means of a self-lubricating flange bearing 47. A dirt protective element or gasket 48 may be connected to the unit 40–45 by means of bolts 49 and so arranged as to have sliding contact at 50 with the upper end of the king pin 30. The extension member 43' of the sleeve 43 may be sealed at the wall 46 by means of a labyrinth packing generally designated 51 and of the design illustrated in FIG. 9.

In the embodiment shown in FIGS. 6 and 11 the electrical connection between the tractor 1 and the trailer/semi-trailer 2 consists of two electrical cables 42 each containing three leads connected to three contact pins 54–56, 57–59 in the junction box 40 and 54'–56', 57'–59', respectively, in the insulator body 19 of the locking bolt 11, for instance in one cable a stop light lead, a lead for the left-hand direction indicator and a ground wire common to them, and in the other cable a lead for the right-hand direction indicator, a lead for parking light and a ground wire common to them. Of the two flexible air pressure conduits 41, one is a feed conduit for high pressure — about 100 pounds per square inch — for the brakes of the trailer/semi-trailer and for the wheel lifting device 4 of the trailer 2, while the other is an operating conduit for the brakes. The electrical contact pins which are arranged in the locking bolt 11 and which may have fixed contact elements have their counterpart in for instance movable contact pins in the insulator body 44 of the junction box 40. In the embodiment shown in FIGS. 8 and 9 use is made of a single electrical cable having six leads.

Electrical contact between the contact pins is ensured by pressure engagement which is realized on one hand in that the locking bolt 11 is urged upwardly by the spring 20 against the underside of the sleeve-shaped king pin 30, and on the other hand in that the contact pins 54–57 in the insulator body 44 include contact elements 63 urged downwardly by springs 62, as shown in detail in FIG. 10 where a contact pin e.g., 54 is shown.

FIG. 12 shows one way of realizing connection between an air pressure line 41 in the coupling member 7 secured to the tractor and an air pressure line 41 in the coupling member 8 secured to the trailer/semi-trailer 2. The tubes 70, 71 in the two insulator bodies 19, 44 may be of plastics material or metal, and connection between the tubes 70, 71 is realized by spring force in that the tube 70 in the locking bolt 11 of the coupling member 7 has a non-return valve 74 disposed in the widened end of the tube and loaded by a spring 72 into engagement with a valve seat 73, and a sleeve 75 movable against the action of the spring load on the non-return valve and having sealing means 76 for tight pressure engagement against the end of the tube 71. A locking ring 77 keeps the sealing means and the valve member of the non-return valve in position in the tube 70. This arrangement provides automatic closure of the air pressure lines in the coupling mechanism member 7 in the disengaged state thereof.

Coupling between the tractor 1 and the trailer vehicle 2 is realized by backing the tractor against the vehicle 2 when the latter occupies the position illustrated in FIG. 2, that is the vehicle 2 is supported with all wheels in ground contact in the manner of a full trailer, but with the draw bar 80 raised in order not to obstruct the coupling operation. The correct height position of the fifth wheel 9 is set by means of the height adjustment device 5 which is operated by means of a control in the tractor driver's cabin and consists of a bellows which is connected to the air pressure feed system of the tractor and disposed between the vehicle frame 1' and the pivotally mounted frame section 6 in the manner illustrated in FIGS. 3 and 6 and as described more in detail in the following. When the tractor is backed after the correct height has been set, the hollow king pin 30 secured to the trailer 2 is passed into the opening of the fifth wheel 9 and into the groove 35 beneath the fifth wheel flange 36. However, to make this possible, the spring-loaded locking bolt 11 must first be pulled downwards out of the way, which is realized in that air is supplied to the compressed air box 21 for pulling down the locking bolt 11 against the action of the spring 20. When the king pin 30 has reached the correct final position in engagement with the fifth wheel 9 the locking bolt 11 is moved upwards and into the king pin 30 by air being discharged from the compressed air box. The two coupling members 7 and 8 are now coupled together.

However, in backing the tractor 1 against the trailer 2 it is difficult to ensure that the movement takes place with aligned longitudinal axes of the tractor and the trailer, thereby guaranteeing that the air pressure and electrical power lines have been correctly connected. Correct connection also at a certain angular position of the tractor relative to the trailer 2 is made possible in that the unit 40-45 in the coupling member 8 is rotatably mounted. To make manual angular setting unnecessary the unit 40-45 is provided with a pair of wedge-shaped or conical guide pins 81 (see FIGS. 8 and 9) which are adapted for engagement in complementary conical or wedge-shaped recesses 82 in the upper end of the coupling member 7 secured to the tractor. The recesses 82 have relatively wide upwardly facing mouths whereby the pins 81, which constitute male guides, can slide down into the recesses 82 which form female guides, the unit 40-45 being turned into correct position for establishing the described electrical connection and air pressure connection. To make a correct initial position possible for the unit 40-45 in the king pin 30 prior to connection, use is made of a device illustrated in FIG. 8 and comprising a spring arm 84 which is connected at one end to a part 2' of the trailer/semi-trailer 2 and which at the outer end carries a roller 85 for engagement in a recess 86 in the flange 31.

In a preferred embodiment of the lifting device 5 for height adjustment of the frame section 6 said lifting device includes a sleeve-shaped vertical air bellows 90 which at the lower end is tightly connected by means of a circular set of bolts 93 (see FIG. 5) to a bottom plate 91 having lateral flanges 92. The marginal bead at the upper end of the bellows 90 is similarly connected in a tight manner by means of bolts 94 to a rigid top plate 95. Said top plate is connected by bars 96 to a short transverse beam 97 which is connected at its ends with the longitudinal fifth wheel frame beams 16a, 16b which are of box-shaped section. A central brace 99 extends between a fastening 98 on the short transverse beam and the front portion of the vehicle frame 1' and is pivotally connected with said fastening by means of a bearing including a rubber bushing 100 and is similarly connected at 101 with its front end to the vehicle frame 1'. This device serves as a parallel guide for the air bellows 90 and, together with lateral guides formed by longitudinal frame beams 102 on either side of the pivotally mounted frame section 6, contributes to preventing wobbling of the bellows 90. As shown, the flanges 92 are connected to said frame beams 102. The pivotally mounted frame section 6 can be raised and lowered by means of the bellows 90 for an amount of approximately 30 cm, counted at the center of the fifth wheel 9.

The stroke length in an upward direction can be limited by means of abutments 103 (see FIG. 5). In the embodiment illustrated in FIGS. 3-5, the pivotally mounted frame section 6 as already mentioned is connected to the vehicle frame also by means of shock absorbers 10 which are mounted in a substantially vertical position between the vehicle frame 1' and the frame section 6, the shock absorbers being pivoted to said frame and to said frame section. As shown in FIGS. 3 and 4 the shock absorbers 10 are connected at their lower ends with fastenings 105 on the vehicle frame 1', and the frame section 6 is rigidified by means of a number of transverse short beams 106-108 at the two ends and the central portion of said section.

Like the shock absorbers 10, the lifting device 5 can be utilized with a view to providing increased travelling comfort, apart from their use as height adjusting means.

The lifting device 4 for raising a front wheel pair of the trailer/semi-trailer 2 into semi-trailer position comprises one or two air bellows 111 connected to the wheel support 110 and being of a similar kind as the height adjusting bellows 90 already bescribed. After the trailer 2 has been coupled to the tractor as a semi-trailer, the wheel lifting bellows 111 are filled with air from the tractor 1 thereby to raise the wheels to the position in which they are shown in FIG. 1. To this end, the bellows are mounted beneath the frame 115 for the wheel support 110, said frame 115 being pivoted to the vehicle body 116 in a per se known manner for permitting the trailer to be used as a conventional trailer with steerable wheels. In FIG. 3 the lifting bellows 110 are shown filled with air and the front wheel axle 117 and wheels of the trailer 2 are in the raised position (cf. also FIG. 1). To this end, the wheel axle 117 in the construction illustrated in FIG. 3 is connected to the upper rigid end walls 118 of the bellows 111 by means of lifting arms 119, while the bellows 111 rest with their lower rigid end walls on a bracket table 120 carried at the underside of the frame 115.

As shown in FIG. 3 two draw beams 122 extend in a forward direction from the pivotally mounted frame 115, the trailer draw bar 80 being pivoted to the ends of said draw beams. Said draw beams are positioned laterally of the fifth wheel 9 when the trailer 2 is coupled to the tractor as a semi-trailer and do not obstruct articulation of the vehicle combination. When the trailer 2 is connected as a conventional full trailer the draw bar 80 is lowered and an eye 125 at the end of the bar is hooked onto a draw hook 126 secured to the rear end of the vehicle frame. At the use of the trailer 2 as a semi-trailer the front pivoting wheel supports thereof, to which the draw beams 122 are connected, should be locked for instance by locking of the draw bar 80 in raised position.

For establishing the air pressure and electrical power connection between the tractor 1 and the trailer 2 when the latter is used as a full trailer, use can be made of a service line connecting mechanism previously known in connection with trailers. This mechanism need not include any air line to the lifting device 4, which need not be used in trailer operation. To prevent dirtying of the connections of the semi-trailer couplings these may have closure means. In FIG. 4 there is shown at the fifth wheel 9 a closure means in the form of a plate 130 which is movable against the action of spring force in guides formed in said fifth wheel. The fifth wheel can also ensure that the locking bolt 11 cannot be urged upwards before the plate 130 has been moved aside, which takes place automatically as the connection is realized, when the locking bolt 11 is inserted in position and urged against the protective plate 130.

As will appear from the following the tractor 1 is equipped with controls for the maneuvers required for connecting together the units of the vehicle combination.

Figure 15:
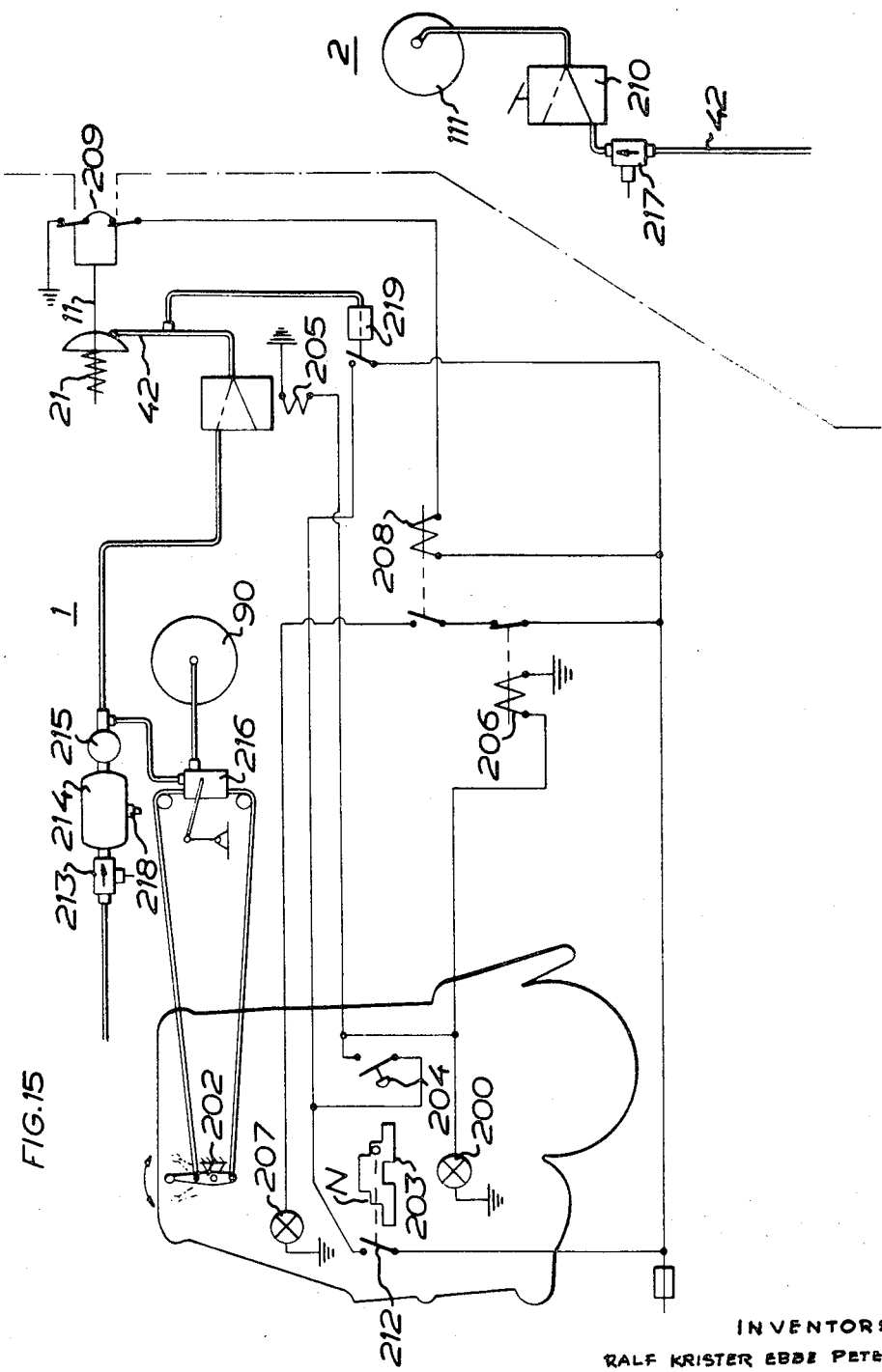
FIG. 15 shows a view similar to FIG. 14 but illustrating the connection of the circuits when the tractor is driven with a semi-trailer.

The electrical power system and the air pressure line system for the automatic semi-trailer coupling according to the present invention are diagrammatically shown in FIGS. 14 and 15. These Figures illustrate the elements associated with the tractor to the left of a dash-and-dot line and those associated with the trailer 2 to the right of said dash-and-dot line.

When connecting together the tractor and the trailer/semi-trailer 2 it should first be checked that the draw bar 80 used with the trailer 2 as a full trailer has been swung to raised position and that a blue indicating lamp 200 is lighted. When lighted said lamp shows that the locking bolt 11 is pulled down into its lower position. The tractor 1 is then backed against the trailer/semi-trailer 2, the driver adjusting the suitable height level of the fifth wheel by means of the level control 202. When the tractor 1 has reached the correct position for the coupling member 7 to engage the coupling member 8 a gear selecting lever 203 is set in position "N" and the driver interrupts the electrical contact in a switch 204 which opens a solenoid valve 205 releasing the air from the compressed air box 21, the locking bolt 11 being raised by means of the spring 20. Simultaneously as the driver interrupts the electrical contact in the switch 204 the blue indicating lamp is extinguished and a relay 206 is closed whereby a red warning lamp 207 is lighted. When the locking bolt 11 has been moved upwards into the correct position (locking position) an electrical contact is closed in a switch 209 which in turn disconnects a relay 208 and extinguishes the red warning lamp 207.

In conjunction with the connection of the air pressure and electrical power lines on establishing the mechanical coupling air flows from the air feed line via a three-way valve 210 to the lifting bellows 111 on the front wheel axle 117 of the semi-trailer 2 and raises the semi-trailer into semi-trailer position. After that the driver adjusts the correct height of travel by means of the level control 202.

Furthermore, 212 designates an electrical microswitch which is adapted to interrupt the locking bolt operation when the tractor is driven with a semi-trailer. 213 designates a relief valve between the feed line of the air pressure system and an air reservoir 214 for air pressure equalization. A filter 215 is disposed in the output air line of said reservoir. At the output side of the filter there is connected an air spring valve 216 for level control of he height adjusting bellows 90. 217 designates a relief valve which constitutes an air intake from the compressed air system. Finally, there are shown at 218 a dewatering valve for dewatering the compressed air, and at 219 a pressure switch controlled by the air pressure in the air line 42 and bypassing the switch 212.

FIG. 15 shows the same system as FIG. 11 but after coupling of the vehicle 2 for use as a semi-trailer.

In modification two valves, viz a pressure-controlled two-way valve and a relief valve (not shown), are substituted for the three-way valve 210. The relief valve opens at a certain pressure for admission of air to the lifting bellows, and when the king pin is released the pressure sinks in the air line and a non-return valve (not shown) is opened for venting the air from the bellows.

As already mentioned, the unit 40–45 for air pressure and electrical power connection in the semi-trailer coupling mechanism is rotatable in relation to the king pin and the frame of the trailer/semi-trailer 2 and is adapted to be guided into correct angular position, when coupling is effected, by means of the described guiding device. During driving, the described air pressure and electrical power connector unit 40–45 in the semi-trailer coupling member 8 secured to the trailer/semi-trailer 2 will turn to and fro with respect to the last mentioned coupling member because said unit 40–45 is guided by the guiding device 81, 82 into a definite angular position in relation to the fifth wheel 9. This relative movement of the unit 40–45 in relation to the semi-trailer 2 can be exploited for control purposes in the manner illustrated in FIG. 13. Fixedly connected to the unit 40–45 is a swing arm 300 which extends at right angles to the longitudinal axis of the semi-trailer 2 when said axis is aligned with the longitudinal axis of the tractor. At angular articulation of the tractor and the semi-trailer the swing arm 300 will retain its position relative to the tractor but will make an angle corresponding to said angular articulation with the longitudinal axis of the semi-trailer. These relative movements may be taken out as movements of pull at wires 301 secured to the ends of the swing arm 300, and these wires 301 may be connected to the rear wheel axle of the semi-trailer for steering said axle. Alternatively, the wires or some other transmission mechanism may control for instance stabilizers for the semi-trailer 2, such as air springs or hydraulic control means. The pull exerted at the wires 301 may be utilized for direct operation of the means or device to be operated (or controlled), or may actuate an electrical or pneumatical device such as switches or valves for instance solenoid valves, for the described control or operation.

The unit 40-45 and its connection with the locking bolt 11 can be made accordingly stronger as required for the desired power output.

It will appear from the above that it is the king pin 30 that is rotated in relation to the locking bolt 11 and the unit 40-45 during driving. The bolt 11 and the unit 40-45 thus together constitute an assembly which may be non-rotatable in relation to the tractor, for instance by means of a guide (not shown) between the bolt 11 and the sleeve 14 in FIG. 7. However, it is preferred to have a certain angular mobility that may be permitted within the scope of strength of the diaphragm 24.

While but one tractor 1 and one trailer/semi-trailer 2 have been described in the foregoing it is understood that a vehicle combination of the type shown in FIG. 1 can be supplemented with one or more similar trailers connected to the trailer/semi-trailer 2. Of course, use can be made of hydraulical or electrical lifting means instead of the pneumatical lifting means 4, 5 illustrated for the pivotally mounted frame section 6 and for the front wheels 3 of the trailer 2. Also many other modifications are conceivable within the scope of the appended claims.

What we claim and desire to secure by Letters Patent is:

1. A two-part articulating coupling for a tractor and a semi-trailer comprising:

one part of said coupling supported by said semi-trailer and including a hollow king pin having a vertical axis and a groove on its outer periphery and coupling elements for electric and fluid pressure services disposed in said hollow king pin, a second part of said coupling supported by said tractor and including a fifth wheel mechanism with a rearwardly open slot adapted to receive said hollow king pin and a bearing means with a flange member at an inner part of said slot to support said king pin with said flange member in engagement in said groove on said king pin when said articulated coupling is engaged, a locking bolt housing supported by said tractor beneath said fifth wheel with a locking bolt guide means and a vertically disposed hollow locking bolt mounted in said guide means for vertical movement into said king pin to lock said king pin when said two coupling parts are engaged, coupling elements for electric and fluid pressure services disposed in said hollow locking bolt, each to engage automatically a corresponding element in said king pin when said hollow locking bolt is engaged in said king pin, a movable locking bolt supporting means in said housing, said locking bolt supporting means comprising preloaded spring means connected to said locking bolt and tending to move said locking bolt into and hold it in an extracted, engaged position in the hollow king pin, and a fluid pressure actuated operating device which is connected to said locking bolt and adapted, when fed with fluid pressure, to withdraw said locking bolt from said engaged position in said hollow king pin against the action of said preloaded spring means to a retracted, unengaged position relatively to the king pin, thereby to permit disengagement of the coupling parts.

2. An articulating coupling as claimed in claim 1, wherein said fluid pressure operating device is adapted to be operated from the driver's seat on the tractor, and said other coupling part includes an electrical sensing and signalling means to sense and to deliver at a predetermined position in the tractor driver's cabin a signal indicating that correct engagement of the coupling parts and especially of the locking bolt in the hollow king pin is effected.

3. A two-part articulating coupling for a tractor and a semi-trailer comprising:

one part of said coupling supported by said semi-trailer and including a hollow king pin having a vertical axis and a groove on its outer periphery and coupling elements for electric and fluid pressure services disposed in said hollow king pin, a second part of said coupling supported by said tractor and including a fifth wheel mechanism with a rearwardly open slot adapted to receive said hollow king pin and a bearing means with a flange member at an inner part of said slot to support said king pin with said flange member in engagement in said groove on said king pin when said articulated coupling is engaged, a locking bolt housing supported by said tractor beneath said fifth wheel with a locking bolt guide means and a vertically disposed hollow locking bolt mounted in said guide means for vertical movement into said king pin to lock said king pin when said two coupling parts are engaged, coupling elements for electric and fluid pressure services disposed in said hollow locking bolt, each to engage automatically a corresponding element in said king pin when said hollow locking bolt is engaged in said king pin, a movable locking bolt supporting means in said housing, said locking bolt supporting means comprising preloaded spring means connected to said locking bolt and tending to move said locking bolt into and hold it in an extracted, engaged position in the hollow king pin, and a compressed air box connected to a pressure fluid line and comprising a diaphragm connected to said locking bolt, said diaphragm being movable by fluid pressure supplied to said box, to withdraw said locking bolt from said engaged position in said king pin against the action of said preloaded spring means to a retracted, unengaged position relative to said king pin, thereby to permit disengagement of the coupling parts.

4. An articulating coupling as claimed in claim 3, wherein the tractor is equipped with a longitudinally extending supporting frame which supports said other coupling part at the rear end portion thereof and is pivotally connected to the tractor at its forward end for movement about a transversal pivot axis, and a power operated lifting device which supports said supporting frame on the tractor at a point adjacent to said other coupling part and by which said supporting frame is raisable and lowerable at its rear end by a pivoting movement about said transversal pivot axis at the front end of the supporting frame for adjusting the high level of said other coupling part in relation to the king pin for engagement of said coupling parts.

5. An articulating coupling as claimed in claim 3, wherein said compressed air box is adapted to be operated from the driver's seat on the tractor, and said other coupling part includes an electrical sensing and signalling means to sense and to deliver at a predetermined position in the tractor driver's cabin a signal indicating that correct engagement of the coupling parts and especially of the locking bolt in the hollow king pin is effected.

* * * * *